(12) United States Patent
Lee

(10) Patent No.: US 9,402,504 B2
(45) Date of Patent: Aug. 2, 2016

(54) MICROWAVE MAT

(71) Applicant: CL Trading LLC, Houston, TX (US)

(72) Inventor: Cyndi J Lee, Houston, TX (US)

(73) Assignee: CL Trading LLC, Houston, TX (US)

( * ) Notice: Subject to any disclaimer, the term of this patent is extended or adjusted under 35 U.S.C. 154(b) by 242 days.

(21) Appl. No.: 14/149,652

(22) Filed: Jan. 7, 2014

(65) Prior Publication Data

US 2014/0190962 A1 Jul. 10, 2014

Related U.S. Application Data

(60) Provisional application No. 61/749,738, filed on Jan. 7, 2013.

(51) Int. Cl.
*A47J 36/34* (2006.01)
*A47J 36/02* (2006.01)

(52) U.S. Cl.
CPC ............... *A47J 36/027* (2013.01); *A47J 36/34* (2013.01); *Y10T 428/219* (2015.01); *Y10T 428/2457* (2015.01)

(58) Field of Classification Search
CPC .. A47J 36/027; A47J 36/34; Y10T 428/2457; Y10T 428/219
USPC ................ 219/762; 428/167, 66.7; 156/345.3
See application file for complete search history.

(56) References Cited

U.S. PATENT DOCUMENTS

| | | | | |
|---|---|---|---|---|
| 3,938,727 A * | 2/1976 | Andersson | ............. | A47G 19/03 220/574 |
| 4,825,025 A * | 4/1989 | Seiferth | ................ | A47J 36/022 219/730 |
| 5,053,594 A * | 10/1991 | Thota | ................. | B65D 81/3453 219/730 |
| 6,147,337 A * | 11/2000 | Besser | ...................... | C09K 5/14 126/375.1 |
| 7,176,426 B2* | 2/2007 | Ramirez | ............. | A47G 19/027 126/246 |
| 2007/0082164 A1* | 4/2007 | Sellers | .................... | A47J 36/34 428/43 |
| 2008/0168908 A1* | 7/2008 | Lion | ....................... | A47J 27/04 99/413 |
| 2009/0106876 A1* | 4/2009 | Yeung | ................ | A41D 19/0068 2/167 |
| 2014/0041647 A1* | 2/2014 | Gorji | .................. | A47G 23/0313 126/263.01 |

FOREIGN PATENT DOCUMENTS

DK EP 2210535 A1 * 7/2010 ............. A47G 19/10

* cited by examiner

*Primary Examiner* — David Angwin
*Assistant Examiner* — Biniam Asmelash
(74) *Attorney, Agent, or Firm* — Jeffrey T. Holman

(57) ABSTRACT

A microwave mat for removing items from a microwave oven includes a mat portion and a lip portion. The mat portion includes a plurality of ridges on the bottom side of the mat portion. The mat portion lays flat when the microwave mat is placed on a flat surface. The lip portion includes a plurality of ridges on the bottom side of the lip portion. The lip portion is raised from the flat surface when the microwave mat is placed on a flat surface. The mat portion and the lip portion are made from a single material and the material is a heat resistant material. The mat portion and the lip portion are flexible.

16 Claims, 4 Drawing Sheets

MICROWAVE MAT

CROSS-REFERENCE TO RELATED APPLICATIONS

This application claims the benefit of U.S. Provisional Application No. 61/749,738 filed on Jan. 7, 2013, which is incorporated by reference herein in its entirety.

BACKGROUND

The present disclosure relates to device designed for use in a microwave to better facilitate removal of heated items from the microwave. When food is cooked or heated in a microwave, the food container or dish may also be heated to an uncomfortable level. Removal of the food while it is still hot may involve the use of an oven mitt, glove, trivets, towels, or other utensils which may contact and contaminate the food or result in a spill as a person tries to grab the hot item from the side, top, or bottom of the container.

SUMMARY

Embodiments described herein are directed to a microwave mat for removal of items from a microwave. Embodiments of a microwave mat are described. In one embodiment, a microwave mat includes a mat portion and a lip portion. The mat portion includes a plurality of ridges on the bottom side of the mat portion. The mat portion lays flat when the microwave mat is placed on a flat surface. The lip portion includes a plurality of ridges on the bottom side of the lip portion. The lip portion is raised from the flat surface when the microwave mat is placed on a flat surface. The mat portion and the lip portion are made from a single material and the material is a heat resistant material. The mat portion and the lip portion are flexible. Other embodiments of the microwave mat are also described.

Embodiments of a system are also described. A system for microwaving items using a microwave mat includes a microwave oven containing a microwave mat and a container for heating, the container resting on top of the microwave mat. The microwave mat includes a mat portion and a lip portion. The mat portion includes a plurality of ridges on the bottom side of the mat portion. The mat portion lays flat when the microwave mat is placed on a flat surface. The lip portion includes a plurality of ridges on the bottom side of the lip portion. The lip portion is raised from the flat surface when the microwave mat is placed on a flat surface. The mat portion and the lip portion are made from a single material and the material is a heat resistant material. The mat portion and the lip portion are flexible. Other embodiments of the system are also described.

Embodiments of a method are also described. A method for utilizing a microwave mat in the heating of items in a microwave oven and the transport of items from the microwave oven includes inserting the microwave mat into the microwave oven, inserting a container into the microwave oven, the container resting on the mat portion of the microwave mat, heating the container in the microwave oven, and removing the microwave mat and the container from the microwave oven by contacting only the microwave mat. The microwave mat includes a mat portion and a lip portion. The mat portion includes a plurality of ridges on the bottom side of the mat portion. The mat portion lays flat when the microwave mat is placed on a flat surface. The lip portion includes a plurality of ridges on the bottom side of the lip portion. The lip portion is raised from the flat surface when the microwave mat is placed on a flat surface. The mat portion and the lip portion are made from a single material and the material is a heat resistant material. The mat portion and the lip portion are flexible. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
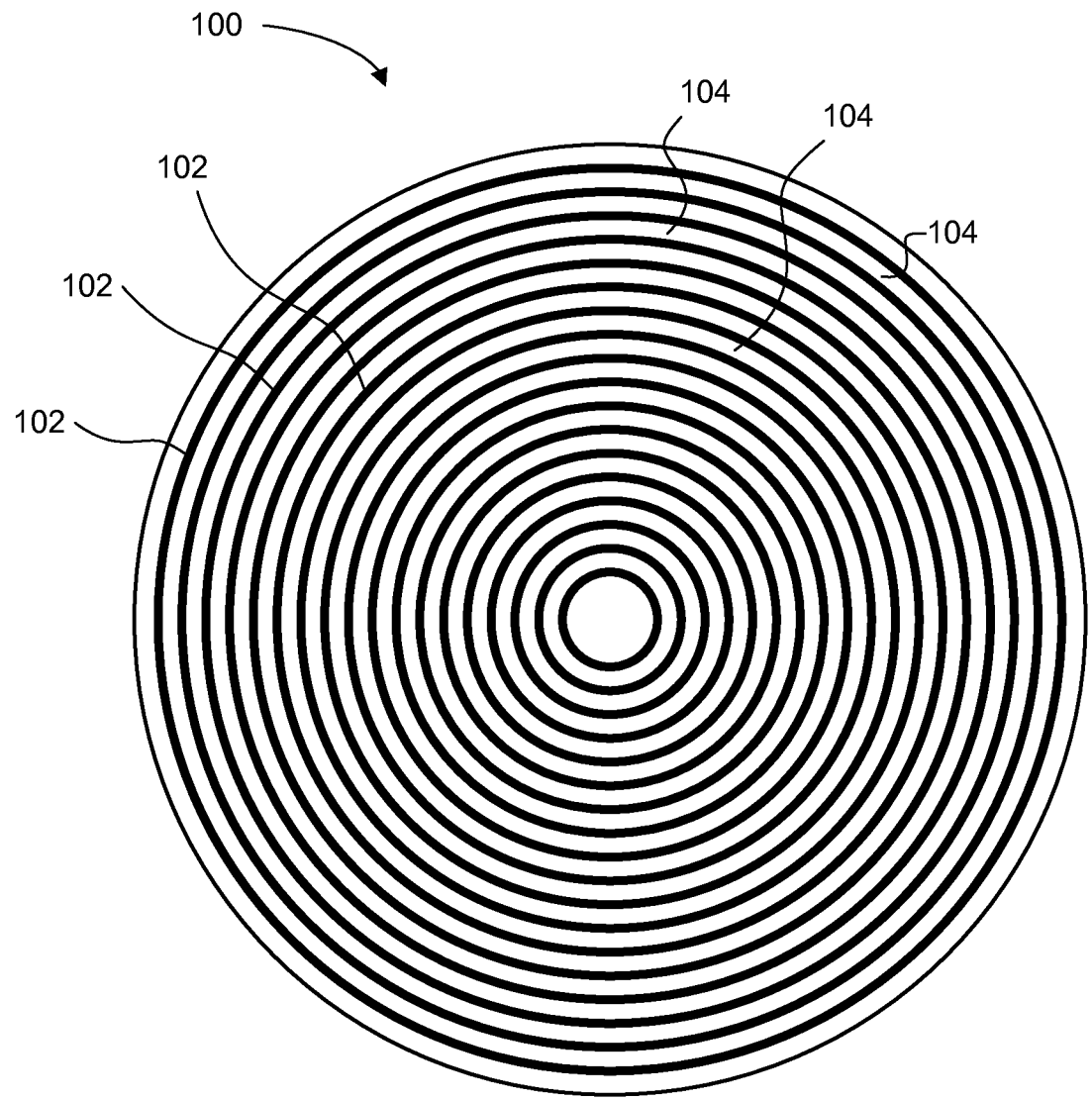
FIG. 1 depicts one embodiment of a bottom view of a microwave mat.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although many embodiments are described herein, at least some of the described embodiments relate to a microwave mat for use in a microwave oven, sometimes referred to as a microwave. Some embodiments allow for the easy removal of hot food containers from a microwave. Some embodiments allow for ease of grip without contacting the food container or surfaces of the microwave or turntable within the microwave. This allows a person to user their hands to remove the hot item from the microwave by using the microwave mat. Some embodiments allow a person to place a food container on top of the microwave mat while heating in a microwave. Some embodiments allow for heat dissipation along the microwave mat to diffuse the heat generated in the microwave oven. Some embodiments allow use of a single microwave mat with containers of varying sizes, shapes, stiffness, and other characteristics.

Various configurations of a microwave mat may be implemented. Various advantages of embodiments may include the ability to lift an item from the bottom up, to leave the mat in the microwave, to grab the mat with ease and without contacting other surfaces within the microwave, to grab the food container without contacting the food or spilling the content, or to set the food container on a table or other surface without damaging the table or other surface. Various embodiments may be utilized as a splash guard.

FIG. 1 depicts one embodiment of a bottom view of a microwave mat 100. Although the illustrated microwave mat 100 of FIGS. 1-4 is shown and described with certain components and functionality, other embodiments of the microwave mat 100 may include fewer or more components to implement less or more functionality. The illustrated bottom view of the microwave mat 100 includes ridges 102 raised from a surface 104. In the illustrated embodiment, the microwave mat 100 is round. In some embodiments, the microwave mat 100 may vary in shape and size and may be a square, rectangle, oval, or any other shape suitable to rest below a container in a microwave oven and suitable for carrying the container by only contacting the microwave mat 100. Although not shown clearly in FIGS. 1 and 2, some embodiments include a lip portion near the edge of the microwave mat 100. The lip portion may be raised to allow for easier grip of the microwave mat 100. The raised lip allows a person to insert the person's fingers below the mat and grip the mat without contacting the bottom surface of the microwave oven or the surface of a turntable within the microwave oven. In some embodiments, the lip portion is slanted upwards. In some embodiment, the lip portion slants at an angle from a plane of a mat portion of the microwave mat. While the mat portion would lay flat on a flat surface, the lip portion would slant upwards from the flat surface. In some embodiments, the angle could be 15° or less. In some embodiments, the angle could be 90°. In the illustrated embodiment, the ridges 102 are circular. In some embodiments, the ridges 102 track the shape of the outer edge of the microwave mat 100. In some embodiments, the ridges 102 form a distinct shape from the outer edge of the microwave mat 100. In some embodiments, the ridges 102 are spaced evenly along the surface 104 of the microwave mat 100. In some embodiments, the ridges 102 are not spaced evenly along the surface 104. In some embodiments, the ridges 102 are spaced to optimally distribute heat efficiently and reduce the contact area of the microwave mat 100 against the surface of the turntable or microwave oven. In some embodiments, the microwave mat 100 is made from a single material. In some embodiments, the microwave mat 100 is made of a heat resistant material. The microwave mat 100 may be made from silicone or other material resistant to heating in a microwave oven. In this way, the microwave mat 100 may serve to insulate the hands of a person when they remove the contents of a microwave oven. A container of food or other item may be placed on top of the microwave mat 100 and heated by the microwave oven. A person may then grip the microwave mat 100 without contacting the food container or any surface of the microwave oven. In some embodiments, the material of the microwave mat 100 is flexible. The flexibility allows the microwave mat 100 to be used with many different containers of all different shapes and sizes. As the microwave mat 100 is flexible it will serve to track the container when lifted and removed from the microwave oven, whether it is a plate, bowl, cup, mug, or other dish. The ridges 102 also allow for superior grip of the microwave mat 100. The microwave mat 100 may also be made of a material with a high coefficient of friction to reduce the possibility of the heated container slipping out of the microwave mat 100 upon transport. The thickness, depth, and cross sectional shape of the ridges may vary. Although not depicted, the microwave mat 100 may include other components to facilitate the advantages and functions outlined above. In some embodiments, the material will resist heat to at least 450 degrees Fahrenheit. In some embodiments, the material will resist heat to at least 400 degrees Fahrenheit or a range of temperatures. In some embodiments, the material may heat during prolonged exposure to microwave heating or if heated alone but resists heat when placed with another item in the microwave oven. The ridges 102 help dissipate heat faster to allow for a mat that may be gripped comfortably from the microwave oven when removing hot items.

Figure 2:
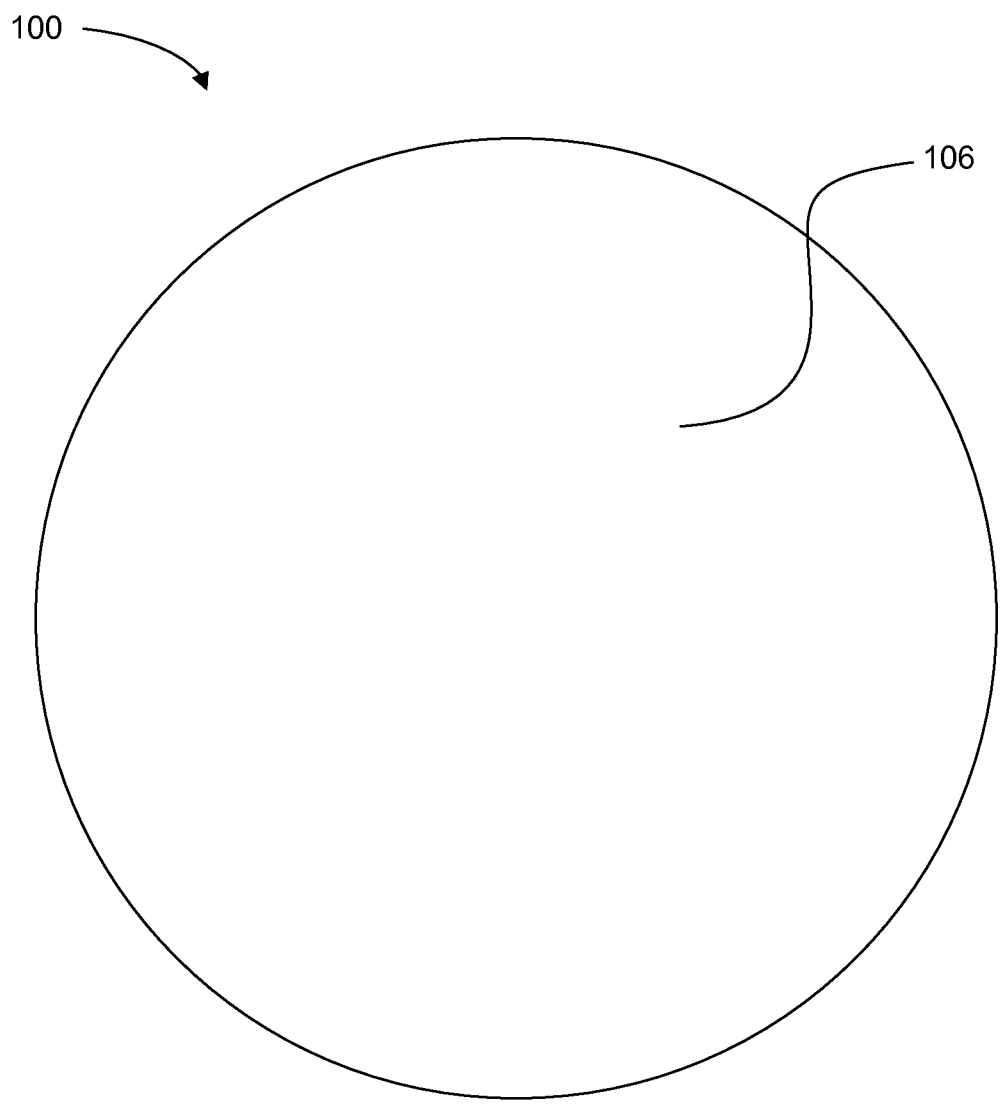
FIG. 2 depicts one embodiment of a top view of the microwave mat of FIG. 1.

FIG. 2 depicts one embodiment of a top view of the microwave mat 100 of FIG. 1. The illustrated microwave mat 100 includes a flat top surface 106. The flat top surface 106 is the surface that an item or container would rest upon in the microwave. In some embodiments the top surface 106 may include ridges similar to the ridges 102 described in conjunction with FIG. 1. In such an embodiment, the raised ridges on the top surface 106 would contact the item or food container during heating of the item or transport of the item. In some embodiments, the raised ridges on the top surface 106 allow for easier grip of the microwave mat 100 or may assist in heat dissipation and may reduce the contact area between the microwave mat 100 and the food container.

Figure 3:
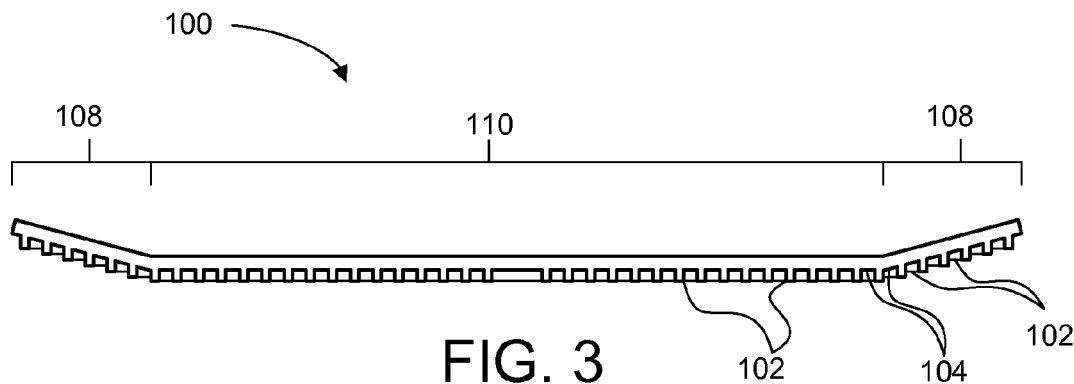
FIG. 3 depicts one embodiment of a cross-sectional side view of a microwave mat similar to FIGS. 1 and 2.

FIG. 3 depicts one embodiment of a cross-sectional side view of a microwave mat 100 similar to FIGS. 1 and 2. The cross-sectional side view shows the cross section at a center line along a circular microwave mat similar to the microwave mat 100 shown in FIGS. 1 and 2. The cross sectional view shows the cross section of the ridges 102 and how the ridges 102 are raised form the surface 104. In the illustrated embodiment, the ridges 102 are rectangular in cross-sectional shape with substantial uniformity in depth and width. The ridges 102 may include various cross-sectional shapes including rounded. The ridges 102 may also be narrower at the base of the cross section or may be wider at the base of the cross section. In some embodiments, the cross section of the ridges 102 may not be uniform along the path the ridges 102 follow along the surface 104. The ridges 102 may include different shapes when viewed from the bottom of the microwave mat 100 and may or may not track or follow the edges of the microwave mat 100. For example, the microwave mat 100 may be a rectangular while the ridges 102 form a circular shape. Or the microwave mat 100 may be an oval and the ridges 102 may be straight lines. The illustrated embodiment includes a lip portion 108 and a mat portion 110. The mat portion 110 tracks or conforms to the surface on which it is set. For example, the mat portion 110 lays flat when the microwave mat 100 is placed on a flat surface. The lip portion 108 is raised from the flat surface when the microwave mat 100 is placed on a flat surface. This allows a person to insert their fingers under the microwave mat 100 without the need to touch the surface on which the microwave mat 100 rests. The surface may be hot. In addition the raised lip portion 108 may reduce the heat buildup in the microwave mat 100 during operation of the microwave oven.

Figure 4:
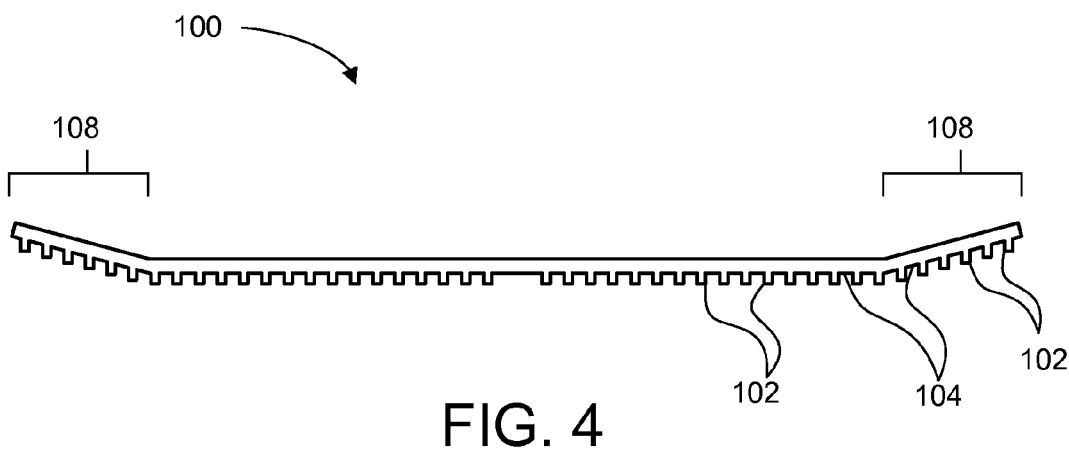
FIG. 4 depicts one embodiment of a cross-sectional side view of a center slice of the microwave mat of FIG. 3.

FIG. 4 depicts one embodiment of a cross-sectional side view of a center slice of the microwave mat 100 of FIG. 3. FIG. 4 shows many of the same features as FIG. 3. The thickness of the microwave mat 100 may vary. In addition, the depth and width of the ridges 102 may vary. In some embodiments, the lip portion 108 may vary in the distance of the edge to the flat surface. In some embodiment, the angle of the raised lip portion 108 may vary. For example, the lip portion 108 may be perpendicular to the mat portion 110.

Figure 5:
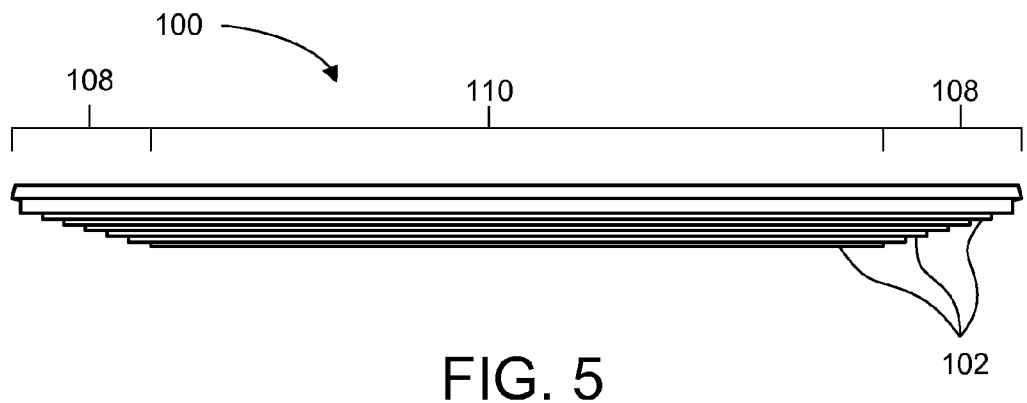
FIG. 5 depicts one embodiment of a side view of the microwave mat of FIGS. 3-4.

FIG. 5 depicts one embodiment of a side view of the microwave mat 100 of FIGS. 3-4. The side view depicts the ridges 102 but obscures view of the surface 104 without viewing a cross section similar to FIGS. 3 and 4. The length of the lip portion 108 as measured from the mat portion 110 to the edge of the microwave mat 100 may vary. In some embodiments, the length will be uniform along the microwave mat 100. In some embodiments, the length will vary along the microwave mat 100.

Figure 6:
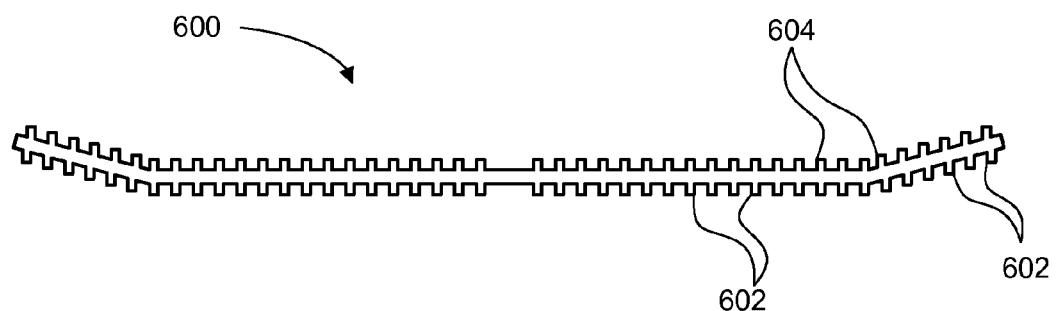
FIG. 6 depicts one embodiment of a cross-sectional side view of a center slice of a microwave mat.

FIG. 6 depicts one embodiment of a cross-sectional side view of a center slice of a microwave mat 600. The illustrated embodiment includes ridges 602 on the bottom of the microwave mat 600 as well as ridges 604 on the top side of the microwave mat 600. The ridges 602 and 604 may allow for greater grip of the microwave mat 600 and increase heat dissipation.

Figure 7:
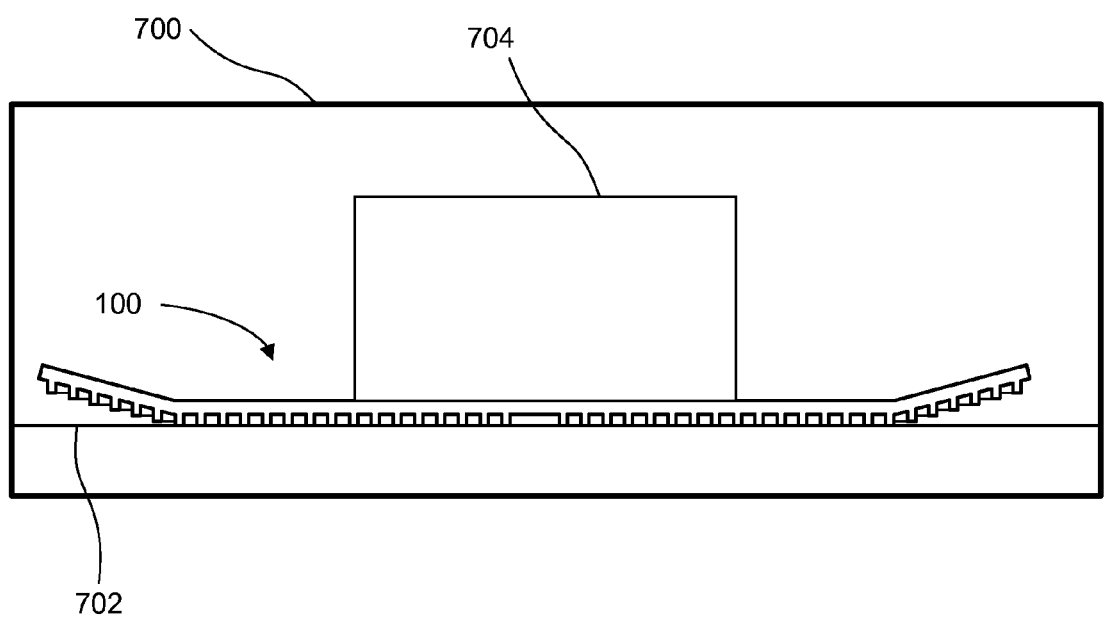
FIG. 7 depicts one embodiment of a system for microwaving items using a microwave mat.

FIG. 7 depicts one embodiment of a system for microwaving items using a microwave mat 100. The illustrated embodiment includes a microwave oven 700 with a microwave mat 100 resting on a surface 702 and a container or item 704 resting on the mat portion of the microwave mat 100. A system for microwaving items 704 using a microwave mat 100 may include a microwave oven 700 containing a microwave mat 100 and a container 704 for heating, the container 704 resting on top of the microwave mat 100. The microwave mat 100 may include a mat portion 110 and a lip portion 108. The mat portion 110 may include a plurality of ridges 102 on the bottom side of the mat portion 110. The mat portion 110 may lay flat when the microwave mat 100 is placed on a flat surface 702. The lip portion 108 may include a plurality of ridges 102 on the bottom side of the lip portion 108. The lip portion 108 may be raised from the flat surface 702 when the microwave mat 100 is placed on the flat surface 702. The mat portion 110 and the lip portion 108 may be made from a single material and the material may resist heating in the microwave oven 700. The mat portion 110 and the lip portion 108 are flexible.

A method for utilizing a microwave mat 100 in the heating of items 704 in a microwave oven 700 and the transport of such items 704 from the microwave oven 700 may include inserting the microwave mat 100 into the microwave oven 700, inserting a container 704 into the microwave oven 700, the container 704 resting on the mat portion 110 of the microwave mat 100, heating the container 704 in the microwave oven 700, and removing the microwave mat 100 and the container 704 from the microwave oven 700 by contacting only the microwave mat 100. The microwave mat 100 includes a mat portion 110 and a lip portion 108. The mat portion 110 includes a plurality of ridges 102 on the bottom side of the mat portion 110. The mat portion 110 lays flat when the microwave mat 100 is placed on a flat surface 702. The lip portion 108 includes a plurality of ridges 102 on the bottom side of the lip portion 108. The lip portion 108 is raised from the flat surface 702 when the microwave mat 100 is placed on a flat surface 702. The mat portion 110 and the lip portion 108 are made from a single material and the material resists heating in the microwave oven 700. The mat portion 110 and the lip portion 108 are flexible. Although the description of a method was described in conjunction with the embodiments described in conjunction with FIGS. 1-7, method may be accomplished with other embodiments.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein may be shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A microwave mat for removing items from a microwave oven, the microwave mat comprising:
    a mat portion comprising a top side and a bottom side, wherein the mat portion comprises a plurality of ridges on the bottom side of the mat portion, wherein the mat portion is configured to lay flat when the microwave mat is placed in a microwave oven, wherein the top side is configured to support a microwavable item and the plurality of ridges on the bottom side of the mat portion are configured to contact a surface of the microwave oven;
    a lip portion directly connected to the mat portion, the lip portion comprising a top side and bottom side, wherein the lip portion comprises a plurality of ridges on the bottom side of the lip portion, wherein the lip portion is configured to be raised from the surface of the microwave oven when the microwave mat is placed on the surface and wherein the plurality of ridges on the bottom side of the lip portion are configured to not contact the microwave oven, wherein the plurality of ridges are designed to insulate a user's hand from heat from the microwavable item and provide a grip able surface for a user's hand; and
    wherein the mat portion and the lip portion consisting of a single material, wherein the material is a heat resistant material designed to resist heat to at least 400 degrees Fahrenheit, wherein the mat portion and the lip portion are designed to flexibly track the microwavable item during a removal of the microwavable item from a microwave oven, and wherein the microwave mat is configured to be used in the microwave oven.

2. The microwave mat for removing items from a microwave oven of claim 1, wherein the material of the mat portion and the lip portion of the microwave mat is silicone.

3. The microwave mat for removing items from a microwave oven of claim 1, wherein the heat resistant material resists heat up to 450 degrees Fahrenheit.

4. The microwave mat for removing items from a microwave oven of claim 1, wherein the microwave mat is round.

5. The microwave mat for removing items from a microwave oven of claim 1, wherein the plurality of ridges on the bottom side of the mat portion and lip portion are evenly spaced concentric circles.

6. The microwave mat for removing items from a microwave oven of claim 1, wherein the mat portion comprises a plurality of ridges on the top side of the mat portion.

7. The microwave mat for removing items from a microwave oven of claim 6, wherein each of the plurality of ridges on the top side of the mat portion aligns with ridge on the bottom side of the mat portion.

8. The microwave mat for removing items from a microwave oven of claim 1, wherein the lip portion comprises a plurality of ridges on the top side of the lip portion.

9. The microwave mat for removing items from a microwave oven of claim 8, wherein each of the plurality of ridges on the top side of the lip portion aligns with a ridge on the bottom side of the lip portion.

10. A system for microwaving items using a microwave mat, the system comprising:
    a microwave oven containing a microwave mat and a container for heating wherein the microwave mat comprises:
        a mat portion comprising a top side and a bottom side, wherein the mat portion comprises a plurality of ridges on the bottom side of the mat portion, wherein the mat portion is configured to lay flat when the microwave mat is placed in the microwave oven, wherein the top side is configured to support the container and the plurality of ridges on the bottom side of the mat portion are configured to contact a surface of the microwave oven;
        a lip portion directly connected to the mat portion, the lip portion comprising a top side and bottom side, wherein the lip portion comprises a plurality of ridges on the bottom side of the lip portion, wherein the lip portion is configured to be raised from the surface of the microwave oven when the microwave mat is placed on the surface and wherein the plurality of ridges on the bottom side of the lip portion are configured to not contact the microwave oven, wherein the plurality of ridges are designed to insulate a user's hand from heat from the microwavable item and provide a grip able surface for a user's hand; and
        wherein the mat portion and the lip portion consisting of a single material, wherein the material is a heat resistant material designed to resist heat to at least 400 degrees Fahrenheit, wherein the mat portion and the lip portion are designed to flexibly track the microwavable item during a removal of the microwavable item from a microwave oven; and
    wherein the container rests on the top side of the mat portion of the microwave mat.

11. The system for microwaving items using a microwave mat of claim 10, wherein the material of the mat portion and the lip portion of the microwave mat is silicone.

12. The system for microwaving items using a microwave mat of claim 10, wherein the microwave mat is round, and wherein the plurality of ridges on the bottom side of the mat portion and lip portion are evenly spaced concentric circles.

13. The system for microwaving items using a microwave mat of claim 10, wherein the mat portion comprises a plurality of ridges on the top side of the mat portion.

14. The system for microwaving items using a microwave mat of claim 13, wherein each of the plurality of ridges on the top side of the mat portion aligns with ridge on the bottom side of the mat portion.

15. The system for microwaving items using a microwave mat of claim 10, wherein the lip portion comprises a plurality of ridges on the top side of the lip portion.

16. The system for microwaving items using a microwave mat of claim 15, wherein each of the plurality of ridges on the top side of the lip portion aligns with a ridge on the bottom side of the lip portion.

* * * * *